US011132280B2

(12) United States Patent
Davis et al.

(10) Patent No.: US 11,132,280 B2
(45) Date of Patent: Sep. 28, 2021

(54) AUTOMATICALLY IDENTIFYING AND HIGHLIGHTING DIFFERENCES BETWEEN HISTORIC TRACES

(71) Applicant: Microsoft Technology Licensing, LLC, Redmond, WA (US)

(72) Inventors: Jackson Michael Davis, Carnation, WA (US); Del Myers, Seattle, WA (US); Patrick Lothian Nelson, Redmond, WA (US); Andrew R. Sterland, Issaquah, WA (US); Leslie Yvette Richardson, Seattle, WA (US); Jordi Mola, Bellevue, WA (US); James M. Pinkerton, Kirkland, WA (US); Mark Marron, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 60 days.

(21) Appl. No.: 16/271,182

(22) Filed: Feb. 8, 2019

(65) Prior Publication Data
US 2020/0257614 A1    Aug. 13, 2020

(51) Int. Cl.
*G06F 11/36* (2006.01)

(52) U.S. Cl.
CPC ...... *G06F 11/3636* (2013.01); *G06F 11/3612* (2013.01)

(58) Field of Classification Search
CPC ............. G06F 11/3612; G06F 11/3636; G06F 11/34–3696
See application file for complete search history.

(56) References Cited

U.S. PATENT DOCUMENTS

| | | | |
|---|---|---|---|
| 9,552,249 B1 * | 1/2017 | James | G06F 11/079 |
| 10,310,969 B2 * | 6/2019 | Bhattacharjee | G06F 11/3688 |
| 2012/0179447 A1 * | 7/2012 | Lin | G06F 11/3696 |
| | | | 703/22 |

(Continued)

OTHER PUBLICATIONS

Tan et al., "Visual, Log-based Causal Tracing for Performance Debugging of MapReduce Systems", published by IEEE Computer Society, 2010 International Conference on Distributed Computing Systems, pp. 795-806 (Year: 2010).*

(Continued)

*Primary Examiner* — S. Sough
*Assistant Examiner* — Zheng Wei
(74) *Attorney, Agent, or Firm* — Workman Nydegger

(57) ABSTRACT

This disclosure relates to identifying and presenting differences between a plurality of recorded executions of an executable entity. One or more models are created over the plurality of recorded prior executions of at least a portion of an executable entity. These models include at least one of (i) a control flow model, or (ii) a data model. An anomalous model data point is identified within these models, and a first location in at least one of the plurality of recorded executions that corresponds to the anomalous model data point is identified. A second location in the at least one of the plurality of recorded executions is also identified. This second location is causal to the anomalous model data point at the first location. The identity of the first and/or second locations in the least one of the plurality of recorded executions is presented.

20 Claims, 5 Drawing Sheets

(56) References Cited

U.S. PATENT DOCUMENTS

2014/0215443 A1* 7/2014 Voccio ............... G06F 11/3688
 717/128
2016/0292061 A1* 10/2016 Marron .............. G06F 11/3636
2018/0253369 A1* 9/2018 O'Dowd ............ G06F 11/3664
2018/0260562 A1 9/2018 Chen et al.
2018/0285184 A1* 10/2018 Hotta ................... G06F 11/079

OTHER PUBLICATIONS

Nandi et al., "Anomaly Detection Using Program Control Flow Graph Mining from Execution Logs", published by KDD '16, Aug. 13-17, 2016, San Francisco, CA, USA, pp. 215-224 (Year: 2016).*
Kc et al., ELT: Efficient Log-based Troubleshooting System for Cloud Computing Infrastructures, published by IEEE Xplore, pp. 1-15 (Year: 2011).*
Leoni et al., "A general process mining framework for correlating, predicting and clustering dynamic behavior based on event logs", published by Information Systems56(2016), pp. 235-257 (Year: 2016).*
Zamir et al., "Using Model-Based Diagnosis to Improve Software Testing", published by Proceedings of the Twenty-Eighth AAAI Conference on Artificial Intelligence, pp. 1135-1141 (Year: 2014).*
"International Search Report and Written Opinion Issued in PCT Patent Application No. PCT/US20/014680", dated May 7, 2020, 11 Pages.
Zeller, Andreas, "Isolating cause-effect chains from computer programs", In Proceedings of the 10th ACM SIGSOFT Symposium on Foundations of Software Engineering, Nov. 18, 2002, pp. 1-10.

* cited by examiner

AUTOMATICALLY IDENTIFYING AND HIGHLIGHTING DIFFERENCES BETWEEN HISTORIC TRACES

BACKGROUND

Tracking down and correcting undesired software behaviors is a core activity in software development. Undesired software behaviors can include many things, such as execution crashes, runtime exceptions, slow execution performance, incorrect data results, data corruption, and the like. Undesired software behaviors might be triggered by a vast variety of factors, such as data inputs, user inputs, race conditions (e.g., when accessing shared resources), etc. Given the variety of triggers, undesired software behaviors can be rare and seemingly random, and extremely difficult reproduce. As such, it can be very time-consuming and difficult for a developer to identify a given undesired software behavior. Once an undesired software behavior has been identified, it can again be time-consuming and difficult to determine its root cause(s).

Developers have classically used a variety of approaches to identify undesired software behaviors, and to then identify the location(s) in an application's code that cause the undesired software behavior. For example, a developer might test different portions of an application's code against different inputs (e.g., unit testing). As another example, a developer might reason about execution of an application's code in a debugger (e.g., by setting breakpoints/watchpoints, by stepping through lines of code, etc. as the code executes). As another example, a developer might observe code execution behaviors (e.g., timing, coverage) in a profiler. As another example, a developer might insert diagnostic code (e.g., trace statements) into the application's code.

While conventional diagnostic tools (e.g., debuggers, profilers, etc.) have operated on "live" forward-executing code, an emerging form of diagnostic tools enable "historic" debugging (sometimes referred to as "time travel" or "reverse" debugging), in which the execution of at least a portion of a program's thread(s) is recorded into one or more trace files (i.e., a recorded execution). Using some tracing techniques, a recorded execution can contain "bit-accurate" historic trace data, which enables the recorded portion(s) the traced thread(s) to be virtually reproduced or "replayed" down to the granularity of individual instructions (e.g., machine code instructions, intermediate language code instructions, etc.). Thus, using "bit-accurate" trace data, diagnostic tools can enable developers to reason about a recorded prior execution of subject code, as opposed to a live forward execution of that code. For example, a historic debugger might enable both forward and reverse breakpoints/watchpoints, might enable code to be stepped through both forwards and backwards, etc. A historic profiler, on the other hand, might be able to derive code execution behaviors (e.g., timing, coverage) from prior-executed code.

Even with the addition of historic debugging/diagnostic technologies, it can still be difficult for developers to identify both when an undesired software behavior has occurred, was well as the cause of that undesired software behavior.

BRIEF SUMMARY

At least some embodiments described herein utilize machine learning techniques to automatically identify differences between a plurality of recorded executions of an entity. For example, these machine learning techniques can be used to identify a location in a particular recorded execution, such as a historic trace, at which an anomalous data value and/or behavior occurred, when compared to data values and behaviors observed in the other recorded executions. Embodiments can further apply analysis techniques, such as data flow analysis, code flow analysis, and/or data model analysis to identify a location in this particular recorded execution—which is prior to the location of the anomaly—where the particular recorded execution diverged from the other recorded executions. Thus, embodiments can facilitate identifying a location prior to an anomalous data value or behavior that could be causal to the occurrence of the anomalous data value or behavior. Thus, given a plurality of recorded executions of an entity, embodiments can operate to identify and present anomalies those recorded executions, as well as identify and present the locations of potential root causes of those anomalies.

In accordance with the foregoing, some embodiments are directed methods, systems, and computer program products that identify differences between a plurality of recorded executions of an executable entity. These embodiments can include receiving trace data comprising a plurality of recorded prior executions of at least a portion of an executable entity. These embodiments can also include creating one or more models over the plurality of recorded prior executions, the one or more models including at least one of (i) a control flow model, or (ii) a data model. These embodiments can also include identifying an anomalous model data point within the one or more models, identifying a first location in at least one of the plurality of recorded executions that corresponds to the anomalous model data point, and identifying a second location in the at least one of the plurality of recorded executions that is causal to the anomalous model data point at the first location. These embodiments can also include presenting the identity of the first and/or second locations in the least one of the plurality of recorded executions.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1A:
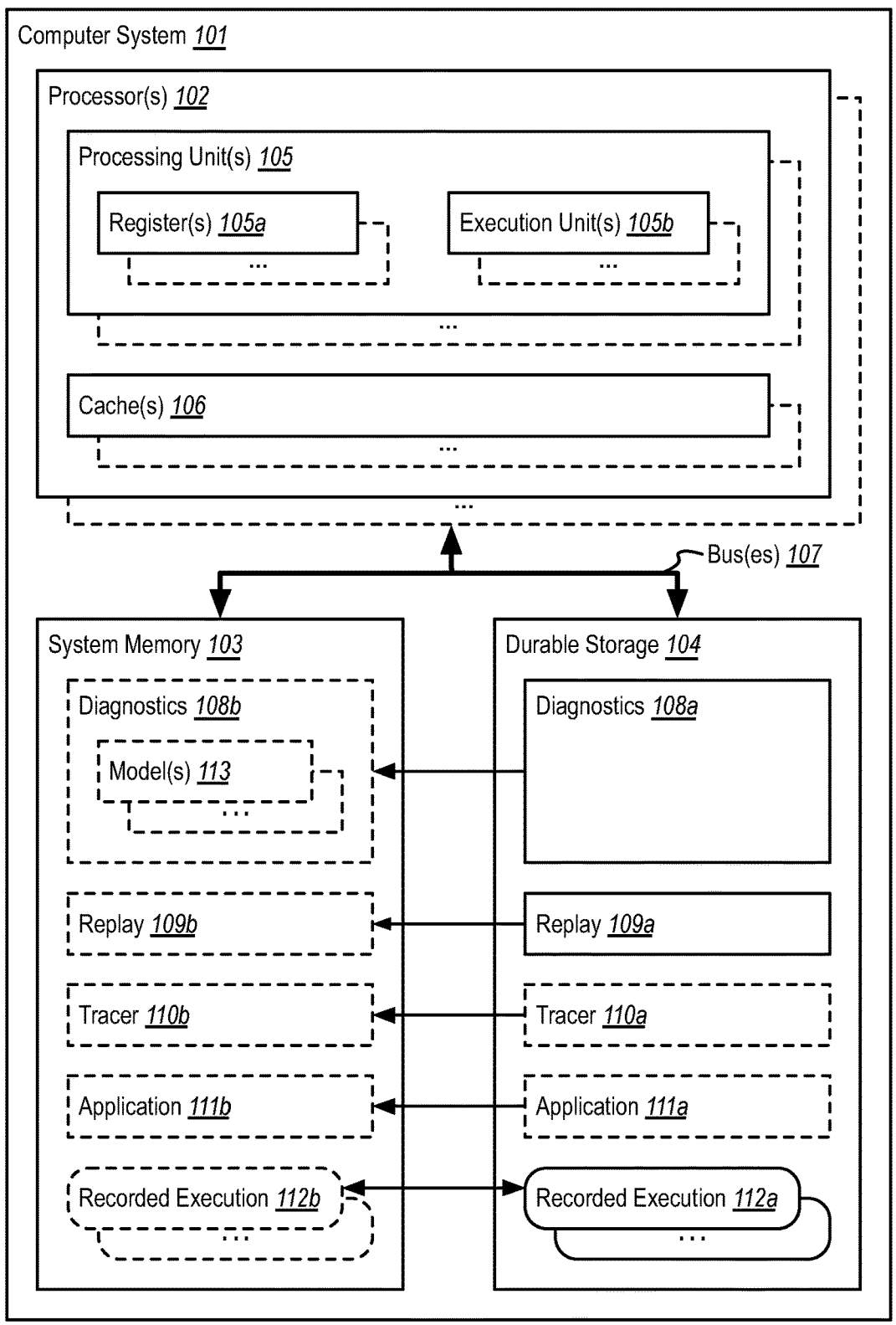
FIG. 1A illustrates an example computing environment that facilitates utilizing machine learning techniques to automatically identify and present differences between a plurality of recorded executions of an entity.

At least some embodiments described herein utilize machine learning techniques to automatically identify differences between a plurality of recorded executions of an entity. For example, these machine learning techniques can be used to identify a location in a particular recorded execution, such as a historic trace, at which an anomalous data value and/or behavior occurred, when compared to data values and behaviors observed in the other recorded executions. Embodiments can further apply analysis techniques, such as data flow analysis, code flow analysis, and/or data model analysis to identify a location in this particular recorded execution—which is prior to the location of the anomaly—where the particular recorded execution diverged from the other recorded executions. Thus, embodiments can facilitate identifying a location prior to an anomalous data value or behavior that could be causal to the occurrence of the anomalous data value or behavior. Thus, given a plurality of recorded executions of an entity, embodiments can operate to identify and present anomalies those recorded executions, as well as identify and present the locations of potential root causes of those anomalies.

As indicated, the embodiments herein operate on recorded executions of executable entities. In this description, and in the following claims, a "recorded execution," can refer to any data that stores a record of a prior execution of code instruction(s), or that can be used to at least partially reconstruct the prior execution of the code instruction(s). In general, these code instructions are part of an executable entity, and execute on physical or virtual processor(s) as threads and/or processes (e.g., as machine code instructions), or execute in a managed runtime (e.g., as intermediate language code instructions instructions). Thus, a recorded execution might refer to variety of historic debugging technologies.

In general, historic debugging technologies record the execution state of an entity at various times, in order to enable execution of that entity to be at least partially virtually executed later from that recorded execution state. The fidelity of that virtual execution varies depending on what recorded execution state is available. For example, one class of historic debugging technologies, referred to herein as "time-travel debugging," records a bit-accurate trace of an entity's execution. This bit-accurate trace can then be used later to faithfully replay that entity's prior execution down to the fidelity of individual code instructions. For example, a bit-accurate trace might record information sufficient to reproduce initial processor state for at least one point in a thread's prior execution (e.g., by recording a snapshot of processor registers), along with the data values that were read by the thread's instructions as they executed after that point in time (e.g., the memory reads). This bit-accurate trace can then be used to replay execution of the thread's code instructions (starting with the initial processor state) based on supplying the instructions with the recorded reads.

Another class of historic debugging technology, referred to herein as "branch trace debugging," relies on reconstructing at least part of an entity's execution based on working backwards from a dump or snapshot (e.g., a crash dump of a thread) that includes a processor branch trace (i.e., which includes a record of whether or not branches were taken). These technologies start with values (e.g., memory and register) from this dump or snapshot and, using the branch trace to partially determine code execution flow, iteratively replay the entity's code instructions and backwards and forwards in order to reconstruct intermediary data values (e.g., register and memory) used by this code until those values reach a steady state. These techniques may be limited in how far back they can reconstruct data values, and how many data values can be reconstructed. Nonetheless, the reconstructed historical execution data can be used for historic debugging.

Yet another class of historic debugging technology, referred to herein as "replay and snapshot debugging," periodically record full snapshots of an entity's memory space and processor registers while it executes. If the entity relies on data from sources other than the entity's own memory, or from a non-deterministic source, these technologies might also record such data along with the snapshots. These technologies then use the data in the snapshots to replay the execution of the entity's code between snapshots.

FIG. 1A illustrates an example computing environment 100a that facilitates utilizing machine learning techniques to automatically identify and present differences between a plurality of recorded executions of an entity. As depicted, computing environment 100a may comprise or utilize a special-purpose or general-purpose computer system 101 that includes computer hardware, such as, for example, one or more processors 102, system memory 103, and durable storage 104, which are communicatively coupled using one or more communications buses 107.

As shown, each processor 102 can include (among other things) one or more processing units 105 (e.g., processor cores) and one or more caches 106. Each processing unit 105 loads and executes machine code instructions via the caches 106. During execution of these machine code instructions at one more execution units 105b, the instructions can use internal processor registers 105a as temporary storage locations, and can read and write to various locations in system memory 103 via the caches 106. In general, the caches 106 temporarily cache portions of system memory 103; for example, caches 106 might include a "code" portion that caches portions of system memory 103 storing application code, and a "data" portion that caches portions of system memory 103 storing application runtime data. If a processing unit 105 requires data (e.g., code or application runtime data) not already stored in the caches 106, then the processing unit 105 can initiate a "cache miss," causing the needed data to be fetched from system memory 103—while potentially "evicting" some other data from the caches 106 back to system memory 103.

As illustrated, the durable storage 104 can store computer-executable instructions and/or data structures representing executable software components. Correspondingly, during execution of this executable software at the processor(s) 102, one or more portions of the executable software can be loaded into system memory 103. For example, the durable storage 104 is shown as potentially having stored thereon code and/or data corresponding to a diagnostics component 108a, a replay component 109a, a tracer component 110a, and an application 111a. Correspondingly, system memory 103 is shown as potentially having resident corresponding portions of code and/or data (i.e., shown as diagnostics component 108b, replay component 109b, tracer component 110b, and application 111b). As also shown, durable storage 104 can also store data files, such as a plurality of recorded executions 112a—all, or part, of which can also be resident in system memory 103, shown as a plurality of recorded executions 112b.

In general, the diagnostics component 108 utilizes machine learning techniques to automatically identify and present differences between a plurality of prior executions of one or more portions of application 111, as logged by recorded executions 112. In doing so, the diagnostics component 108 may rely on reconstructing one or more portions of the recorded executions 112. For example, the diagnostics component 108 may work in connection with replay component 109, which leverages trace data in the recorded executions 112 to replay prior-executed code instructions of application 111.

If included in computer system 101, the tracer component 110 can generate one or more recorded executions 112b into system memory 103 based on execution of application 111 at processor(s) 102. Depending on implementation of the tracer component 110, recorded executions 112b might include, for example, trace data enabling time-travel debugging, a dump or snapshot enabling branch trace debugging, a plurality of snapshots enabling replay and snapshot debugging, etc. As shown, the recorded executions 112b might be persisted to durable storage 104 (i.e., as recorded executions 112a).

Figure 2:
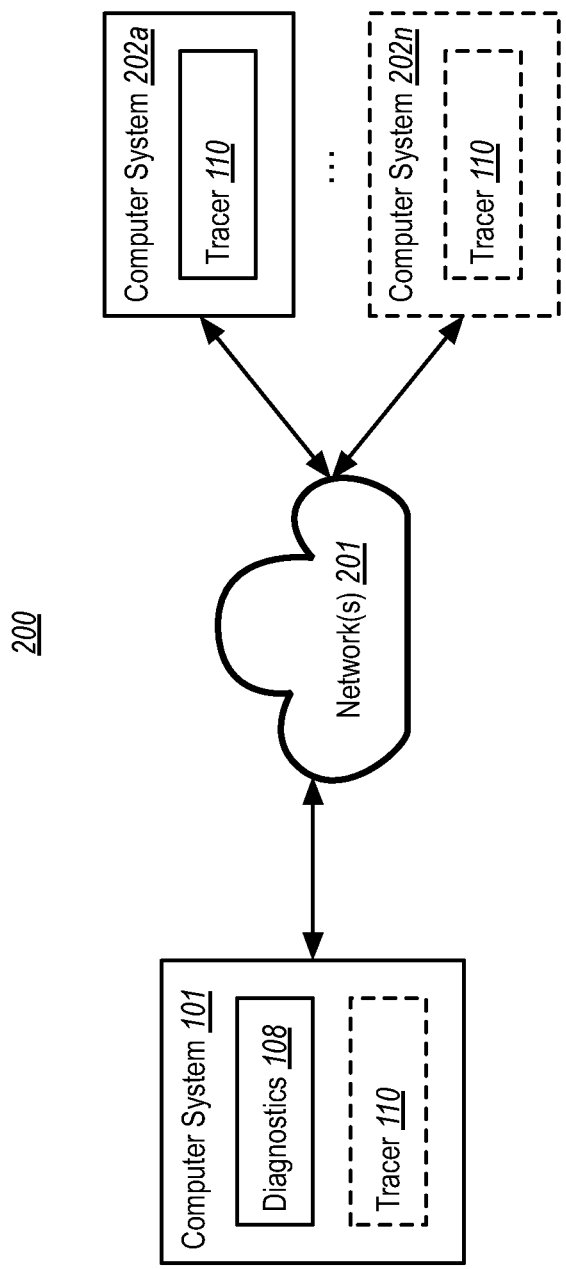
FIG. 2 illustrates an example environment in which the computer system of FIG. 1A is connected to one or more other computer systems over one or more networks.

Whether or not the tracer component 110 and/or the application 111 are included in computer system 101, all or part of the recorded executions 112b might be obtained from other computer system(s). Thus, diagnostics component 108 might operate over historic executions of application 111 at computer system, and/or over historic execution of other copies of application 111 at one or more other computer systems. For example, FIG. 2 illustrates an example environment 200 in which computer system 101 of FIG. 1A is connected to one or more other computer systems 202 (i.e., 202a-202n) over one or more networks 201. As shown, in example 200 each of computer systems 202 includes a tracer component 110, while computer system 101 could optionally include a tracer component 110. As such, computer system 101 can utilize its diagnostics component 108 to operate over historic executions generated by the tracer components 110 at computer systems 202, as well as potentially over historic executions generated by the tracer component 110 at computer system 101 (if is present).

Returning to FIG. 1A, while the diagnostics component 108, the replay component 109, and/or the tracer component 110 might each be independent components or applications, they might alternatively be integrated into the same application (such as a debugging suite), or might be integrated into another software component—such as an operating system component, a hypervisor, a cloud fabric, etc. As such, those skilled in the art will also appreciate that the invention may be practiced in a cloud computing environment of which computer system 101 is a part.

Figure 1B:
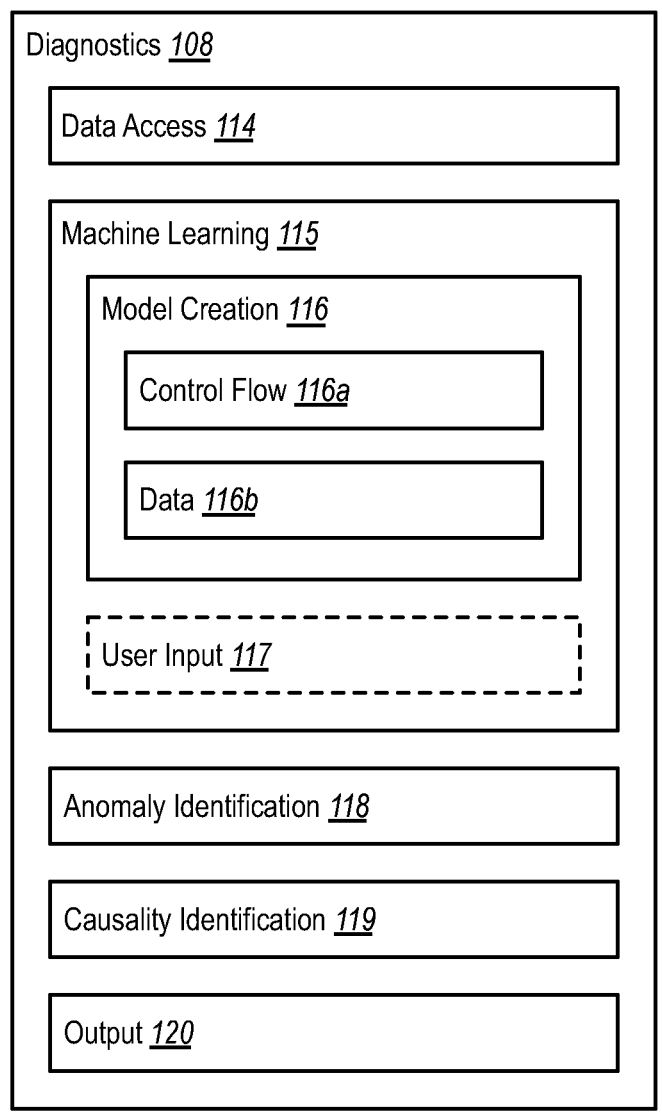
FIG. 1B illustrates additional detail of a diagnostics component, shown in FIG. 1A.

FIG. 1B illustrates an example 100b that provides additional detail of the diagnostics component 108 of FIG. 1A. As depicted, the diagnostics component 108 can include a variety of components (e.g., data access 114, machine learning 115, anomaly identification 118, causality identification 119, output 120, etc.) that represent various functionality the diagnostics component 108 might implement in accordance with various embodiments described herein. It will be appreciated that the depicted components—including their identity and arrangement—are presented merely as an aid in describing various embodiments of the diagnostics component 108 described herein, and that these components are non-limiting to how software and/or hardware might implement various embodiments of the diagnostics component 108 described herein, or of the particular functionality thereof.

The data access component 114 access as plurally of recorded executions of an entity, such as application 111. Thus, for example, the data access component 114 may access recorded executions 112 which, as explained in connection with FIG. 2, may originate from execution of application 111 at computer system 101 and/or from execution of copies of application 111 at one or more other computer systems 202. As discussed, the type of data accessed in connection with the recorded executions 112 can vary depending on the historic debugging technology being used (e.g., time-travel debugging, branch trace debugging, replay and snapshot debugging, etc.).

The breadth of data within a given recorded execution 112 can also vary. For example, one recorded execution 112 might record execution of application 111 at one computer system (e.g., 202a), while another recorded execution 112 might record execution of application 111 at another computer system (e.g., 202n) over the same time period or over different time periods. Additionally, or alternatively, one recorded execution 112 might record a subset of execution of application 111 at a computer system (e.g., 202a), while another recorded execution 112 might record another subset of execution of application 111 at the same computer system (e.g., 202a) over the same time period or over different time periods. For instance, one recorded execution 112 might record execution of one instance, session, function, thread, etc. of application 111 at computer system 202a, while another recorded execution 112 might record execution of another instance, session, function, thread, etc. of application at computer system 202a. Additionally, or alternatively, one recorded execution 112 might record execution of application 111 at a computer system (e.g., 202a) during a first time frame, while another recorded execution 112 might record execution of application 111 at the same computer system (e.g., 202a) during a second time frame. In embodiments, the plurality of accessed recorded executions 112 can include individual recorded executions selected from any combination of the foregoing.

The machine learning component 115 applies machine learning techniques to the plurality of recorded executions 112 accessed by the data access component 114. In embodiments, these machine learning techniques operate to identify whether specific data points appear to be normal (e.g., typical or frequent) or abnormal (e.g., atypical or rare). Based on this analysis, the machine learning component 115 can also identify whether specific recorded executions 112 appear to correspond to normal or abnormal recorded executions 112. It is noted that use of the terms "normal" and "abnormal" herein does not necessarily imply whether the corresponding data point is good or bad, correct or incorrect, etc.—only that it appears to be an outlier compared to similar data points seen across the recorded executions 112.

While the machine learning component 115 could use a variety of machine learning techniques, in embodiments the machine learning component 115 develops one or more models over the recorded executions 112, each of which captures and characterizes different attributes obtained from those recorded executions 112. For example, in FIG. 1B, the machine learning component 115 includes a model creation component 116, which creates one or more models 113 (see FIG. 1A) over the recorded executions 112. For instance, the machine learning component 115 can create one or more models 113 that each capture different types of data points obtained from the recorded executions 112, and that characterize individual data points as being normal or abnormal—for example, by applying curve fitting techniques on these values to classify them as normal values (e.g., within a threshold of a median value) or abnormal values (e.g., outside of the threshold).

In some embodiments, the model creation component 116 might create code control flow models and/or data models. As such, FIG. 1B shows the model creation component 116 as including a control flow component 116a that creates code control flow models and a data component 116b that creates data models. In embodiments, a control flow model models data points comprising patterns of code instruction execution obtained from the recorded executions 112. For example, a control flow model might capture and classify patterns in function call behaviors (e.g., call graphs), patterns in the outcome of conditional and branch statements, patterns in the execution of basic blocks, and the like. For instance, with respect to the example of basic blocks (i.e., contiguous sequences of code instructions with no branches in except to their entry, and no branches out except at their exit), the control flow component 116a might identify first basic blocks in the code instructions of application 111. Then, using the recorded executions 112, the control flow component 116a might build graphs of sequences of execution of these basic blocks in order to represent code paths in the execution of application 111. The control flow component 116a can then classify which graphs/sequences are normal, and which are abnormal, using techniques such as curve fitting.

In embodiments, a data model captures data points comprising data entity values observed in the recorded executions 112. For example, a given data model might capture a plurality of values seen for a given data entity (e.g., a variable, a function parameter, a return value, a blob, a database value, etc.) across the recorded executions 112. For instance, using the recorded executions 112, the data component 116b might gather the values seen for a particular data entity. Then, the data component 116b might classify each of these values as normal or abnormal, using techniques such as curve fitting. In embodiments, the data component 116b might create a different data model for each data entity of interest.

Notably, the model creation component 116 might develop models 113 using a static analysis of the recorded executions 112. Additionally, or alternatively, the model creation component 116 might develop models 113 using a dynamic analysis of the recorded executions 112. In embodiments, a dynamic analysis could include replaying one or more code instructions from the recorded executions 112, at least in part. As such, the model creation component 116 might leverage the replay component 109 when developing models 113.

The types and/or fidelity of models that can be created by the model creation component 116 might depend on the historic debugging technology used to create the recorded executions 112. For example, time-travel debugging technologies might enable high-fidelity control flow and data modeling over the recorded executions 112, while branch trace debugging technologies might enable high-fidelity control flow modeling, but potentially lower-fidelity data modeling over the recorded executions 112 (e.g., based on what percentage of values are able to be recovered). When branch trace debugging technologies are used, at times it might not be possible (or practical) to recover any data values. In these cases, the model creation component 116 might create only control flow model(s), while omitting data flow models entirely. It will be appreciated that the types and/or fidelity of models created by the model creation component 116 can affect the types of analysis that are available to the anomaly identification component 118 and/or the causality identification component 119.

As shown, the machine learning component 115 might include a user input component 117. As such, the machine learning component 115 can utilize user input when applying its machine learning techniques. For example, the machine learning component 115 might utilize user input specifying particular data points as being normal or abnormal, might utilize user input specifying particular recorded executions as being normal or abnormal, might utilize user input that validates or overrides a classification, and the like. Thus, the machine learning component 115 can utilize supervised machine learning techniques, in addition or as an alternative to unsupervised machine learning techniques.

The anomaly identification component 118 identifies particular location(s) in the recorded executions 112 where anomalous data points have occurred. For example, utilizing one or more data models generated by the data component 116b, the anomaly identification component 118 might identify an anomalous data value for a data entity, and identify location(s) in the at least one of the recorded executions 112 where that anomalous data value was observed. In another example, utilizing one or more data models generated by the data component 116b, the anomaly identification component 118 might identify an anomalous data flow pattern, and identify location(s) in the at least one of the recorded executions 112 where that anomalous data flow pattern was observed. In another example, utilizing one or more control flow models generated by the control flow component 116a, the anomaly identification component 118 might identify an anomalous pattern in code control flow, and identify location(s) in the at least of one the recorded executions 112 where that anomalous code control flow pattern occurred.

Based on the anomaly identification component 118 having identified a particular location in a particular recorded execution 112 where an anomalous data point occurred, the causality identification component 119 can identify at least one location in the particular recorded execution 112 that is prior in execution time to the particular location, and that is causal to the anomalous data point at the particular location. For example, the causality identification component 119 might perform a data flow analysis to identify data entities (and their location in the recorded execution 112) whose value(s) contributed to an anomalous data value at the particular location. Additionally, or alternatively, the causality identification component 119 might perform a control flow analysis to identify code that executed prior to the particular location, and which contributed to anomalous program state at the particular location. Additionally, or alternatively, the causality identification component 119 might use the models 113 to determine where data values and/or control flow of the particular recorded execution 112 appear to be different from the other recorded executions 112, and where they appear to be similar to the other recorded executions 112. Using one or more of the foregoing techniques, the causality identification component 119 can effectively work backwards from the particular location in the particular recorded execution 112 where the anomalous data point was identified, and determine where there was an initial divergence in the particular recorded execution 112 from "normal" behaviors seen in other recorded executions 112. In other words, the causality identification component 119 can determine at least one location—prior to the identified particular location—in the particular recorded execution 112 where the particular recorded execution 112 is distinguishable from the other recorded executions 112, and where it becomes indistinguishable from the other recorded executions 112. Often times, it may be likely that a root cause of the anomaly occurred at this location.

In embodiments, the causality identification component 119 might additionally or alternatively perform a temporal analysis that iteratively works backwards from an anomalous data point to determine what data or code behaviors correlates well with occurrence of the anomalous data point. For example, the machine learning component 115 may have identified multiple recorded executions of a function defined by code instructions 301a that exhibited an anomalous data point of the function throwing an exception. The causality identification component 119 might perform an analysis of these recorded executions to identify if there is a data or code behavior—just prior to the exception—that has a high correlation with the function throwing an exception. For instance, the causality identification component 119 could determine that there is causality between an "if" statement within the function evaluating false and the function throwing an exception. This might, for example, be because the "if" statements includes a "throw" statement when it evaluates false. The causality identification component 119 can then perform an additional analysis of the recorded executions to determine if there is a prior data or code behavior—just prior to the "if" statement—that has a high correlation with the function throwing an exception. This analysis can be repeated iteratively until there are no longer any data or code behaviors that correlate well with the exception. The causality identification component 119 might then determine that the last identified a data or code behavior is causal to the exception. For example, it may determine that a call to the function when the second parameter is a particular value is a location that is causal to an anomalous data point.

The output component 120 outputs data identified by the anomaly identification component 118 and/or the causality identification component 119. The output component 120 could output to a user interface (e.g., corresponding to diagnostics component 108) or to some other software component. For example, the output component 120 could present information such as (i) the identity of which recorded execution(s) appear to be "normal" and/or which recorded execution(s) appear to be "abnormal," (ii) the location(s) of any anomalous data point(s) identified by the anomaly identification component 118, (iii) information about the anomalous data point(s) identified by the anomaly identification component 118 (e.g., data values, control flow information, etc.), (iv) any location(s) identified by the causality identification component 119 as being causal to the location(s) of anomalous data points(s) identified by the anomaly identification component 118, (v) any data models generated by the machine learning component 115, and the like. If the output component 120 outputs to a user interface, this user interface could visualize one or more recorded execution(s) 112 (e.g., along a timeline), could highlight differences between different recorded execution(s) 112, could highlight particular locations and/or data on the recorded execution(s) 112, and the like. If the output component 120 outputs to another software component, that component might act on that data in some way. For example, that software component might be profiler, a debugger, and the like, which can provide for further analysis of identified locations and/or data in a recorded execution 112.

In view of the components and data of FIGS. 1A, 1B, and 2, FIG. 3 illustrates an example 300 of operation of diagnostics component 108. As shown, FIG. 3 includes code instructions 301, which represent the executable code of an application (e.g., application 111). Following arrow 305a, recorded executions 302 represent a plurality of recorded executions of all, or part, of prior executions of those code instructions 301 at one or more computer systems. In particular, the recorded executions 302 are shown as including recorded executions 302a-302d. As an example, and referring to FIG. 2, recorded execution 302a might represent a prior execution of code instructions 301 at computer system 202a over a particular period of time, recorded executions 302b and 302c might represent different subsets (e.g., as different threads, different sessions, etc.) of code instructions 301 at computer system 202n over that same period of time, and recorded execution 302d might represent execution of a particular subset of code instructions 301 over different periods of time at computer system 101. For instance, recorded execution 302d might correspond to repeated executions of code instructions 301a—which could correspond, for instance, to different calls to particular function, a particular module, etc.

Figure 3:
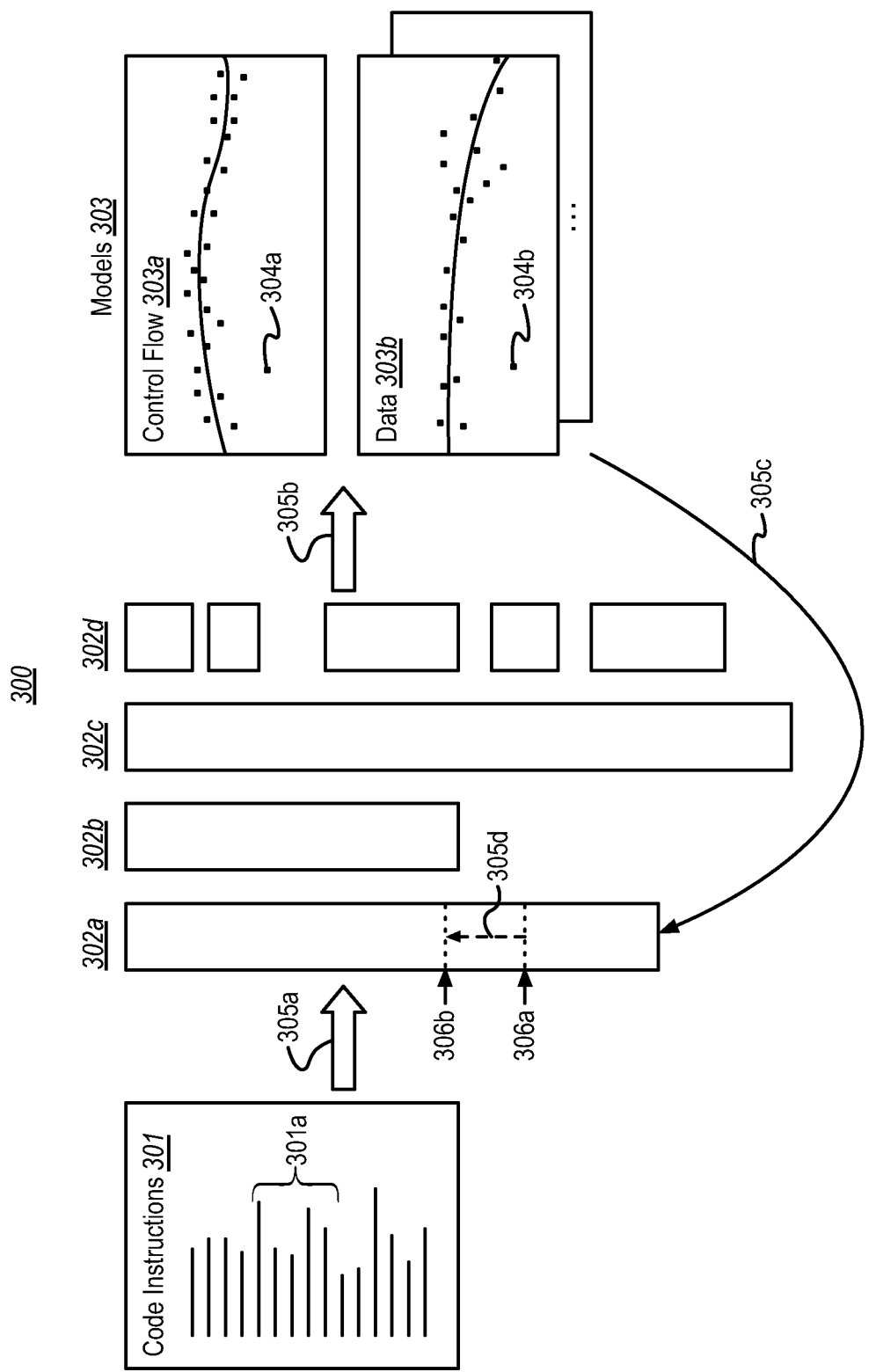
FIG. 3 illustrates an example of operation of the diagnostics component of FIGS. 1A and 1B.

Referring to FIG. 1B, the data access component 114 might access these recorded executions 302 and, following arrow 305b, the machine learning component 115 might then generate one or more models 303 over these recorded executions 302. In FIG. 3, the depicted models 303 include a control flow model 303a (e.g., generated by the control flow component 116a) and a plurality of data models 303b (e.g., generated by the data component 116b). Each of models 303b might correspond to a different data entity, such as a different variable, parameter, return value, etc. As shown, each of these models 303 represents a plurality of data points, as well as a curve showing a normal or typical distribution of these data points.

Using these models 303, and as shown by arrow 305c, the anomaly identification component 118 might determine that recorded execution 302a includes at least one anomalous data point (e.g., data point 304a and/or 304b, which fall outside of their corresponding normal distributions), and that this anomalous data point was observed at a first location 306a in recorded execution 302a. Then, as indicated by arrow 305d, the causality identification component 119 might use data flow analysis, control flow analysis, and/or a comparison of models 303 to identify a second location 306b in recorded execution 302a that is causal to the occurrence of the anomalous data point at the first location 306a. As discussed, it may be at this second location 306b where the models 303 indicate that data values and/or control flow within recorded execution 302a deviated from normal data values and/or control flow within one or more of the other recorded executions (e.g., 302b-302c). The output component 120 can present information, such as models 303, data points 304, locations 306, etc. at a user interface or to another software component for further analysis.

Figure 4:
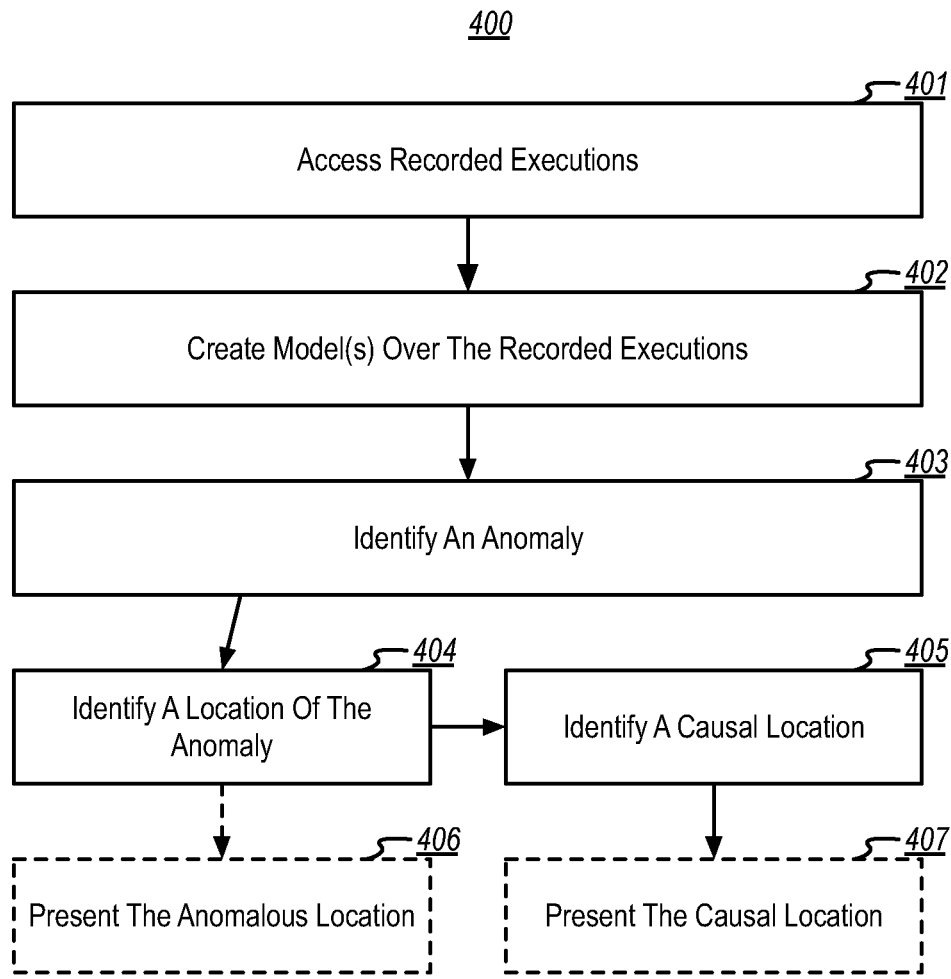
FIG. 4 illustrates a flow chart of an example method for identifying differences between a plurality of recorded executions of an executable entity.

FIG. 4 illustrates a flowchart of an example method 400 for identifying differences between a plurality of recorded executions of an executable entity. Method 400 is now described in connection with FIGS. 1A, 1B, 2, and 3. As shown in FIG. 4, method 400 includes an act 401 of accessing recorded executions. In some embodiments, act 401 comprises receiving trace data comprising a plurality of recorded prior executions of at least a portion of an executable entity. For example, the data access component 114 might access recorded executions 112, which each of which records at least a portion of a prior execution of application 111. In FIG. 3, these recorded executions 112 may be recorded executions 302 of code instructions 301. As explained in connection with FIG. 2, these recorded executions 112/302 might be obtained from a single computer system, or from a plurality of computer systems, and could each record execution of all, or part, of code instructions 301.

Method 400 also includes an act 402 of creating model(s) over the recorded executions. In some embodiments, act 402 comprises creating one or more models over the plurality of recorded prior executions, the one or more models including at least one of (i) a control flow model, or (ii) a data model. For example, as indicated by arrow 305b, the machine learning component 115 can create one or more models 113/303 over the accessed recorded executions 112/302. These models could include, for example, one or more control flow models 303a created by the control flow component 116a and/or one or more data models 303b created by the data component 116b. As shown in FIG. 3, each model 303 could model a plurality of data points, including identifying a normal distribution of these data points. In connection with creating model(s) over the recorded executions, the machine learning component 115 might also classify each of the accessed recorded executions 112/302 as being anomalous or normal. For example, if a model indicates that a recorded executions contributed anomalous data points to the model, the machine learning component 115 might classify that recorded execution as anomalous.

Method 400 also includes an act 403 of identifying an anomaly. In some embodiments, act 403 comprises identifying an anomalous model data point within the one or more models. For example, the anomaly identification component 118 might identify data points 304a and/or 304 as being anomalous within their respective models. These data points 304 might be anomalous, for example, because they fall outside of a particular threshold from a curve defining a normal distribution of data points within their respective model. Thus, identifying the anomalous model data point within the one or more models could comprise applying a curve fitting analysis to a plurality of data points in each of the one or more models, including determining that the anomalous model data point deviates from a curve by at least a threshold. As will also be appreciated in view of the foregoing discussion of the anomaly identification component 118, identifying the anomalous model data point could include combinations of (i) anomaly detection on variable values in at least one data model, (ii) anomaly detection over control flow data in at least one control flow model, or (iii) anomaly detection over data flow data in at least one data model.

Method 400 also includes an act 404 of identifying a location of the anomaly. In some embodiments, act 404 comprises identifying a first location in at least one of the plurality of recorded executions that corresponds to the anomalous model data point. For example, based on having identified the anomalous model data point in act 403, the anomaly identification component 118 can identify a location in at least one of the accessed recorded executions 112/302 (e.g., location 306a in recorded execution 302a) where that anomalous model data point was observed. In embodiments, this location might be readily identifiable form the model itself (e.g., because it is associated with anomalous model data point within the model). In other embodiments, this location might be found using a static or dynamic analysis of the recorded executions 112/302.

Method 400 also includes an act 405 of identifying a causal location. In some embodiments, act 405 comprises identifying a second location in the at least one of the plurality of recorded executions that is causal to the anomalous model data point at the first location. For example, the causality identification component 119 can identify a location (e.g., location 306b in recorded execution 302a) that prior to the first location where the anomalous model data point was observed (e.g., location 306a in recorded execution 302a), and that is causal to the program's state at the first location. The causality identification component 119 could use different types of analysis to identify this causal location, such as data flow analysis, control flow analysis, using the models 303 to identify where recorded execution 302a diverged from the other recorded executions (e.g., 302b-302d), working backwards from the first location to identify data or code behaviors that correlate with occurrence of the anomalous model data point, etc.

Method 400 can also include an act 406 of presenting the anomalous location and/or an act 407 of presenting the causal location. In some embodiments, act 406 comprises presenting the identity of the first location in the least one of the plurality of recorded executions, and act 407 comprises presenting at least the identity of the second location in the least one of the plurality of recorded executions. As shown, act 406 (i.e., presenting the anomalous location) might occur after act 404 (i.e., identifying the location of the anomaly), or in connection with act 407 (i.e., presenting the causal location). In embodiments, acts 406/407 could comprise presenting at software component (e.g., a debugger, profiler, etc.), and/or to a user interface (e.g., corresponding to diagnostics component 108). In embodiments, when presenting at a user interface, acts 406/407 might comprise highlighting a difference between recorded executions, including highlighting differences between first and/or second locations of an "anomalous" recorded execution and corresponding locations at "normal" recorded executions.

Accordingly, the embodiments described herein utilize machine learning techniques to automatically identify differences between a plurality of recorded executions of an entity. These machine learning techniques can then be used to identify a location in a particular recorded execution at which an anomalous data value and/or behavior occurred, when compared to data values and behaviors observed in the other recorded executions. Embodiments can further apply analysis techniques, such as data flow analysis, code flow analysis, and/or data model analysis to identify a location in this particular recorded execution—which is prior to the location of the anomaly—where the particular recorded execution diverged from the other recorded executions. Thus, embodiments can facilitate identifying a location prior to an anomalous data value or behavior that could be causal to the occurrence of the anomalous data value or behavior. Thus, given a plurality of recorded executions of an entity, embodiments can operate to identify and present anomalies those recorded executions, as well as identify and present the locations of potential root causes of those anomalies.

In view of the foregoing disclosure, it will be appreciated that the embodiments herein can enable a variety of useful types of debugging and analysis. For example, by supplying a library of recorded executions to the diagnostics component 108, computer system 101 can indicate which recorded executions appear to be abnormal, where those abnormalities appear to be exhibited, and where the potential root cause(s) of those abnormalities may have been first seen. Thus, computer system 101 can identify both known and unknown undesired behaviors, including their potential root causes. In another example, given a library of recorded executions of a particular entity that have been classified as normal or abnormal, computer system 101 could receive submission of new recorded execution(s) of that entity and then classify those new recorded execution(s) as being normal or abnormal. This information could be used, for example, to determine if a new build of the entity introduces any new bugs or regressions, to determine if a recorded execution that is suspected as having exhibited an undesired behavior indeed did so, to determine if there was an abnormal behavior caused by a security intrusion, etc. In yet another example, computer system 101 could be used to help a developer understand code behaviors, whether they be undesired or not. For instance, a developer might be able to specify a particular code element (e.g., the second parameter of function "foo"), and computer system 101 could present typical and non-typical values of this code element to help the developer understand behavior of function foo.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

Embodiments of the present invention may comprise or utilize a special-purpose or general-purpose computer system that includes computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical storage media that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud computing model can be composed of various characteristics, such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A method, implemented at a computer system that includes one or more processors and a memory, for using a dynamic replay-based analysis to identify an anomaly in execution of an executable entity, the method comprising:
   receiving trace data comprising a plurality of recorded prior executions of at least a portion of the executable entity;
   replaying at least a portion of each of the plurality of recorded prior executions;
   based on the replaying of at least the portion of each of the plurality of recorded prior executions,
      reconstructing, for each prior execution of the executable entity, at least (i) a portion of prior code instruction execution, and (ii) one or more prior runtime data entity values; and
      creating a plurality of models over the plurality of recorded prior executions, including:
         (i) based on reconstructing at least the portion of prior code instruction execution for each prior execution of the executable entity, creating a control flow model that models a plurality of patterns of at least the portion of the prior code instruction execution across the plurality of recorded prior executions, and
         (ii) based on reconstructing the one or more prior runtime data entity values for each prior execution of the executable entity, creating a data model that models, for at least one data entity, a plurality of prior runtime data values of the at least one data entity across the plurality of recorded prior executions;
   identifying an anomalous model data point using the plurality of models, based on identifying both of (i) an anomalous pattern of at least the portion of the prior code instruction execution within the control flow model, and (ii) an anomalous value of the at least one data entity within the data model;
   identifying a first location in at least one of the plurality of recorded prior executions over which the plurality of models were created, and that corresponds to the anomalous model data point;
   identifying a second location in the at least one of the plurality of recorded prior executions that is causal to the anomalous model data point at the first location; and
   presenting at least an identity of the second location in the at least one of the plurality of recorded prior executions.

2. The method of claim 1, further comprising also presenting an identity of the first location in the at least one of the plurality of recorded prior executions.

3. The method of claim 1, wherein identifying the second location in the at least one of the plurality of recorded prior executions comprises performing at least one of (i) a data flow analysis, or (ii) a control flow analysis.

4. The method of claim 1, wherein identifying the second location in the at least one of the plurality of recorded prior executions comprises using at least one of the plurality of models to identify where the at least one of the plurality of recorded prior executions diverged from one or more others of the plurality of recorded prior executions.

5. The method of claim 1, wherein identifying the second location in the at least one of the plurality of recorded prior executions comprises iteratively working backwards from the first location to identify data or code behaviors that correlate with occurrence of the anomalous model data point.

6. The method of claim 1, wherein the presenting comprises presenting at one or more of (i) a software component, or (ii) a user interface.

7. The method of claim 1, wherein identifying the anomalous value of the at least one data entity within the data model comprises at least one of: (i) anomaly detection on values of the at least one data entity in the data model, or (ii) anomaly detection over data flow in the data model.

8. The method of claim 1, wherein identifying the anomalous model data point comprises:
   applying a curve fitting analysis to a plurality of data points in each of the plurality of models; and
   determining that the anomalous model data point deviates from a curve by at least a threshold.

9. The method of claim 1, further comprising classifying the at least one of the plurality of recorded prior executions as being anomalous, and classifying one or more others of the plurality of recorded prior executions as being normal.

10. The method of claim 9, wherein the presenting comprises highlighting a difference between the at least one of the plurality of recorded prior executions, and at least one of the one or more others of the plurality of recorded prior executions at the second location.

11. A computer system, comprising:
   at least one processor; and
   at least one computer-readable media having stored thereon computer-executable instructions that are executable by the at least one processor to cause the computer system to use a dynamic replay-based analysis to identify an anomaly in execution of an executable entity, the computer-executable instructions including instructions that are executable to cause the computer system to perform at least the following:
      receive trace data comprising a plurality of recorded prior executions of at least a portion of the executable entity;
      replay at least a portion of each of the plurality of recorded prior executions;
      based on the replaying of at least the portion of each of the plurality of recorded prior executions,
         reconstruct, for each prior execution of the executable entity, at least (i) a portion of prior code instruction execution, and (ii) one or more prior runtime data entity values; and create a plurality of models over the plurality of recorded prior executions, including:
  (i) based on reconstructing at least the portion of prior code instruction execution for each prior execution of the executable entity, creating a control flow model that models a plurality of patterns of at least the portion of the prior code instruction execution across the plurality of recorded prior executions, and
  (ii) based on reconstructing the one or more prior runtime data entity values for each prior execution of the executable entity, creating a data model that models, for at least one data entity, a plurality of prior runtime data values of the data entity across the plurality of recorded prior executions;
identify an anomalous model data point using the plurality of models, based on identifying both of (i) an anomalous pattern of at least the portion of the prior code instruction execution within the control flow model, and (ii) an anomalous value of the at least one data entity within the data model;
identify a first location in at least one of the plurality of recorded prior executions over which the plurality of models were created, and that corresponds to the anomalous model data point;
identify a second location in the at least one of the plurality of recorded prior executions that is causal to the anomalous model data point at the first location; and
present at least an identity of the second location in the at least one of the plurality of recorded prior executions.

12. The computer system of claim 11, the computer-executable instructions also including instructions that are executable to cause the computer system to present an identity of the first location in the at least one of the plurality of recorded prior executions.

13. The computer system of claim 11, wherein identifying the second location in the at least one of the plurality of recorded prior executions comprises performing at least one of (i) a data flow analysis, or (ii) a control flow analysis.

14. The computer system of claim 11, wherein identifying the second location in the at least one of the plurality of recorded prior executions comprises using at least one of the plurality of models to identify where the at least one of the plurality of recorded prior executions diverged from one or more others of the plurality of recorded prior executions.

15. The computer system of claim 11, wherein the presenting comprises presenting at one or more of (i) a software component, or (ii) a user interface.

16. The computer system of claim 11, wherein identifying the anomalous value of the at least one data entity within the data model comprises at least one of: (i) anomaly detection on values of the at least one data entity in the data model, or (ii) anomaly detection over data flow in the data model.

17. The computer system of claim 11, wherein identifying the anomalous model data point comprises:
applying a curve fitting analysis to a plurality of data points in each of the plurality of models; and
determining that the anomalous model data point deviates from a curve by at least a threshold.

18. The computer system of claim 11, the computer-executable instructions also including instructions that are executable to cause the computer system to classify the at least one of the plurality of recorded prior executions as being anomalous, and classifying one or more others of the plurality of recorded prior executions as being normal.

19. The computer system of claim 18, wherein the presenting comprises highlighting a difference between the at least one of the plurality of recorded prior executions, and at least one of the one or more others of the plurality of recorded prior executions at the second location.

20. A computer program product comprising at least one hardware storage device having stored thereon computer-executable instructions that are executable by at least one processor to cause a computer system to use a dynamic replay-based analysis to identify an anomaly in execution of an executable entity, the computer-executable instructions including instructions that are executable to cause the computer system to perform at least the following:
receive trace data comprising a plurality of recorded prior executions of at least a portion of the executable entity;
replay at least a portion of each of the plurality of recorded prior executions;
based on the replaying of at least the portion of each of the plurality of recorded prior executions,
  reconstruct, for each prior execution of the executable entity, at least (i) a portion of prior code instruction execution, and (ii) one or more prior runtime data entity values; and
create a plurality of models over the plurality of recorded prior executions, including:
  (i) based on reconstructing at least the portion of prior code instruction execution for each prior execution of the executable entity, creating a control flow model that models a plurality of patterns of at least the portion of the prior code instruction execution across the plurality of recorded prior executions, and
  (ii) based on reconstructing the one or more prior runtime data entity values for each prior execution of the executable entity, creating a data model that models, for at least one data entity, a plurality of prior runtime data values of the data entity across the plurality of recorded prior executions;
identify an anomalous model data point using the plurality of models, based on identifying both of (i) an anomalous pattern of at least the portion of the prior code instruction execution within the control flow model, and (ii) an anomalous value of the at least one data entity within the data model;
identify a first location in at least one of the plurality of recorded prior executions over which the plurality of models were created, and that corresponds to the anomalous model data point;
identify a second location in the at least one of the plurality of recorded prior executions that is causal to the anomalous model data point at the first location; and
present at least an identity of the second location in the at least one of the plurality of recorded prior executions.

* * * * *